(12) United States Patent
Lindqvist et al.

(10) Patent No.: US 7,672,447 B1
(45) Date of Patent: Mar. 2, 2010

(54) FREQUENCY DOMAIN ECHO CANCELLER

(75) Inventors: Fredrik Lindqvist, Skärholmen (SE); Antoni Fertner, Solna (SE); Pal Frenger, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2920 days.

(21) Appl. No.: 09/584,796

(22) Filed: Jun. 1, 2000

(51) Int. Cl.
 *H04M 9/08* (2006.01)
(52) U.S. Cl. .............................. 379/406.08; 379/406.12
(58) Field of Classification Search .................. 379/406.01–406.16; 375/285, 296
 See application file for complete search history.

(56) References Cited

U.S. PATENT DOCUMENTS

| 5,117,418 | A | * | 5/1992 | Chaffee et al. ............... 370/289 |
| 5,181,198 | A | | 1/1993 | Lechleider |
| 5,285,474 | A | | 2/1994 | Chow et al. |
| 5,297,166 | A | | 3/1994 | Batruni |
| 5,303,264 | A | | 4/1994 | Ohsawa |
| 5,317,596 | A | * | 5/1994 | Ho et al. ....................... 375/232 |
| 5,461,640 | A | | 10/1995 | Gatherer |
| 5,521,908 | A | | 5/1996 | Younce et al. |
| 5,524,149 | A | | 6/1996 | Frenzel |
| 5,623,513 | A | | 4/1997 | Chow et al. |

(Continued)

FOREIGN PATENT DOCUMENTS

| EP | 0 630 119 A2 | 12/1994 |
| EP | 0 933 897 A2 | 8/1999 |
| WO | 95/17046 | 6/1995 |
| WO | WO 95/17046 | 6/1995 |
| WO | 99/41848 A | 8/1999 |
| WO | WO 99/41848 | 8/1999 |

OTHER PUBLICATIONS

*IEEE Transactions on Communications*, vol. 48, No. 2, Feb. 2000, Hanna Bogucka et al., "Frequency-Domain Echo Cancellation in Digital Multicarrier Modulation Systems," pp. 333-342.

(Continued)

*Primary Examiner*—Alexander Jamal
(74) *Attorney, Agent, or Firm*—Nixon & Vanderhye P.C.

(57) ABSTRACT

An echo canceller reduces an echo signal produced when the transmitted signal leaks back into the receiver via a hybrid. The echo canceller estimates the echo signal from the transmitted signal, and then subtracting the estimated echo signal from the received signal. In practice, the echo path channel in a DMT-modem is much longer than the cyclic prefix, and therefore, the received echo signal will be subjected to both ISI (inter-symbol-interference) and ICI (inter-carrier-interference). A traditional echo canceller, designed for a xDSL-modem, uses either a time domain adaptive FIR-filter or a combined echo canceller implemented in both time and frequency domain. A matrix-based adaptive echo canceller is implemented in the frequency domain. Various example embodiments are disclosed.

41 Claims, 8 Drawing Sheets

U.S. PATENT DOCUMENTS

| | | | | |
|---|---|---|---|---|
| 5,787,113 | A | * | 7/1998 | Chow et al. .................. 375/219 |
| 5,793,801 | A | * | 8/1998 | Fertner ....................... 375/219 |
| 5,870,432 | A | | 2/1999 | Kerckhove |
| 5,917,809 | A | | 6/1999 | Ribner et al. |
| 6,072,782 | A | | 6/2000 | Wu |
| 6,597,745 | B1 | * | 7/2003 | Dowling ..................... 375/296 |

OTHER PUBLICATIONS

*Ann. Telecommun.*, 52, n° 1-2, 1997, Vincent Démoulin et al., "Vector equalization: an alternative approach for OFDM systems," pp. 4-11.

*Proc. Global Telecommunications Conference*, New York, NY, USA, 1996, pp. 1405-1410, John M. Cioffi and G. David Fornery, Jr., "Canonical Packet Transmission on the ISI Channel with Gaussian Noise".

*Proc. Fourteenth Symposium on Information Theory in the Benelux*, Enchede, Netherlands, 1993, pp. 236, 243, A.G.C. Koppelaar, "Matrix Equalization for OFDM Systems".

J.A.C. Bingham, "ADSL, VDSL and Multicarrier Modulation," pp. 247-248, Chapter 11.3 "Echo Cancellation," John Wiley & Sons, Jan. 2000.

*Electronics Letters*, Oct. 10, 1996, vol. 32, No. 21, pp. 1963-1964, P. Van Eetvelt, G. Wade and M. Tomlinson, "Peak to average power reduction for OFDM schemes by selective scrambling".

*IEEE Transactions on Communications*, vol. 44, No. 7, Jul. 1996, pp. 817-825, Minnie Ho, John M. Cioffi, and John A.C. Bingham, "Discrete Multitone Echo Cancelation".

*Comm Theory Mini Conference, Globecom 98*, Sydney, Australia, Nov. 8-12, 1998, pp. 219-224, José Tellado and John M. Cioffi, "Peak Power Reduction for Multicarrier Transmission".

*Proceedings of Radioventenskap och kommunikation 99 (RVK 99)*, Karlskrona, Sweden, Jun. 1999, pp. 1-5, Per Ola Börjesson, Hans G. Feichtinger, Niklas Grip, Mikael Isaksson, Norbert Kaiblinger, Per Ödling, and Lars-Erik Persson, "DMT PAR-reduction by weighted cancellation waveforms".

* cited by examiner

FREQUENCY DOMAIN ECHO CANCELLER

FIELD OF THE INVENTION

The invention relates to digital communication systems. One application of the invention is systems that use multicarrier modulation methods, such as DMT (Discrete Multitone) where DSL (Digital Subscriber Lines) twisted pair subscriber lines are employed for high speed data transmission. Another application of the invention is OFDM (Orthogonal Frequency Division Multiplexing) based systems.

BACKGROUND AND SUMMARY OF THE INVENTION

Referring to FIG. 1, a DSL modem consists of a transmitter 12 and a receiver 14 connected to the subscriber line's twisted-pair 18 (telephone line) via a so-called hybrid circuit 16. The hybrid 16 is a two-to-four wire interface that connects the twisted-pair subscriber line 18 to the four-wire modem (two-wire transmitter and two-wire receiver). An ideal hybrid is exactly matched to the impedance of the subscriber line and transports the transmitter signal only to the subscriber line and the received signal only to the receiver.

A problem with matched hybrids (non-adaptive) is that different subscriber lines have different impedances, and temperature variations make the impedances slowly time-varying. Consequently, the hybrid cannot be exactly matched to the impedance of the subscriber line, and the transmitted signal "leaks" back into the receiver through the hybrid creating an echo signal as shown in FIG. 1. From the receiver's point of view, the echo signal acts like a powerful noise source reducing the signal-to-noise ratio (SNR) and therefore reduces the performance of the receiver. An echo canceller may be used to reduce the influence of the echo in the received signal.

The main purpose of the echo canceller is to reduce the echo signal produced when the transmitted signal "leaks" back into the receiver via the hybrid. The echo canceller works by first estimating the echo signal from the transmitted signal, and then subtracting the estimated echo signal from the received signal. In order to estimate the echo signal, the echo canceller must model the echo path channel. General speaking, the echo canceller performs a "system estimation," where the system to be estimated is the echo path channel. Due to the slowly time-varying nature of the echo path channel, the echo canceller must continuously, but infrequently, update the echo path channel estimation. This update is typically accomplished with an adaptive finite impulse response (FIR) filter to continuously track the slowly time-varying echo path channel.

The echo canceller operates in two different modes: the training mode and the echo cancellation mode. In the training mode, the far-end transmitter is forced to be silent while the near-end modem transmits a training sequence in order to estimate the echo path channel. The estimation of the echo path channel may be accomplished using a fast training algorithm followed by an adaptive algorithm such as the LMS-algorithm. After the echo canceller finishes the training mode, it jumps into the echo cancellation mode where the echo canceller performs echo cancellation, i.e. it subtracts the echo signal from the received signal.

Discrete Multi-tone (DMT) modulation is one form of multicarrier modulation that is attractive because of its ability to utilize, and be implemented by, efficient digital signal processing techniques. The basic idea of DMT modulation is to partition the communication channel into orthogonal and memoryless subchannels using the digital signal processing technique known as the Fast Fourier Transform and the Inverse Fast Fourier Transform (FFT/IFFT). Data transmitted through one subchannel is independent of other subchannels under some orthogonal conditions that will be described later. DMT also allows for efficient and flexible allocation of power and bits to each subchannel.

The DMT modulated signal can be described as a composition of N/2 independent carriers, where each carrier has equal bandwidth and a center frequency $f_i$, where $i=1 \ldots N/2$. For example, ADSL uses 255 carriers (subchannels) downstream and 31 carriers upstream. Each one of the carriers is a Quadrature Amplitude Modulated (QAM) signal with an assigned amplitude and phase. The assigned values for the amplitude and the phase are determined by a signal constellation containing a set of complex values. During start-up, the DMT-system measures the signal-to-noise ratio in each subchannel and assigns different numbers of bits to each subchannel (carrier) to maximize performance. This process is known as adaptive bitloading. A subchannel with low signal-to-noise (SNR) is assigned a small number of bits or no bits, and a subchannel with high SNR is assigned many bits. This technique is robust in a typical Digital Subscriber Line scenario where the line conditions are unknown and slowly time-varying.

A DMT signal that is filtered through a physical channel will be subjected to inter-symbol-interference (ISI) because all practical physical channels have a memory. (The impulse response of the channel is non-zero for more than one point in time). This impairment of the physical channel causes the transmitted DMT symbols to interfere with each other (ISI). Furthermore, the transitions between the DMT symbol cause transients in the received signal. These transients cause interference between the carriers in the same DMT symbol. This type of interference is known as inter-channel interference (ICI), where the "channel" refers to the subchannel. The ISI and ICI imply that the received subchannels do not remain orthogonal (independent) to each other, and therefore, the received data will be corrupted.

The received echo signal, like the received data signal, will also be affected by the ISI and ICI, because all practical physical echo path channels have memory. Thus, the echo from one carrier will leak into every other carrier within the same DMT symbol and the next transmitted DMT symbol.

One way to circumvent, or at least reduce, the ISI and ICI in a DMT-based system is to add a cyclic prefix (guard time) to the beginning of each transmitted DMT symbol. The cyclic prefix (CP) is a mechanism to make the subchannels independent of each other, or in other words, memory-less. A cyclic prefix of L samples means that the last L samples of the N samples long time domain symbol is copied to the beginning of the time domain symbols. Thus, the total length of the prefixed time domain symbol is samples. FIG. 2 illustrates the cyclic prefixing.

If the length of the cyclic prefix is greater than the length of the channel memory, then all ISI and all transients causing ICI will be contained within the cyclic prefix. The receiver can then remove all ISI and ICI by simply discarding the cyclic prefix. This means that the channel will only affect the amplitude and the phase of each transmitted carrier, and different subchannels will remain independent (no ISI or ICI). Unfortunately, increasing the length of the cyclic prefix reduces the data rate. For example, suppose that one time domain symbol is N samples long, and the length of the cyclic prefix is L samples. The data rate is reduced by a factor of N/(N+L).

In a practical DMT-system the echo path channel is much longer than the cyclic prefix, and therefore, the received echo signal is subjected to both ISI and ICI. Hence, the part of the echo signal that corresponds to both ISI and ICI must be estimated and subtracted as well. The present invention provides an echo canceller that takes into account intersymbol interference and interchannel interference when estimating an echo signal to be removed from a received signal. The echo canceller calculates the received echo signal completely in the frequency domain, which is particularly beneficial in a DMT type system because the transmitted data is already available in the frequency domain. Accordingly, the echo estimate is determined using a frequency domain model of an echo path channel that includes the effects of interference like ISI and ICI.

In a first example embodiment, the frequency domain model of the echo path channel is determined using a first matrix of coefficients and a second matrix of coefficients. The first matrix is combined with a current transmitted symbol, and the second matrix is combined with a previously transmitted symbol. The sum of these two combinations is used to estimate the echo signal. The coefficients of the first matrix represent how an echo from a currently transmitted frequency domain signal affects a received signal. The coefficients of the second matrix represent how an echo from a previously transmitted domain symbol affects the received symbol. The coefficients of the first and second matrices are adjusted using a difference between the received signal and the estimated signal.

In a second example embodiment, the current transmitted symbol and the previously transmitted symbol are partitioned into real and imaginary parts before being combined with matrices as described in the first example embodiment. This operation reduces the computational complexity by a factor of two compared to the first example embodiment.

In a third example embodiment, the currently transmitted symbol is combined with a first column vector. The previously transmitted symbol is multiplied with a complex exponential term, in order to compensate for the cyclic prefix, and then subtracted from the current transmitted symbol. The resulting signal is combined with a matrix. The vector and matrix combinations are summed and used to estimate the echo signal to be removed from the received symbol. This third example embodiment reduces the computational complexity approximately by a factor of two compared to the first example embodiment.

In a fourth example embodiment, the operations described in the second and third example embodiments are combined resulting in a reduction of computational complexity approximately by a factor of four compared to the first example embodiment.

In a fifth example embodiment, when the transmitter of a transceiver has a lower sampling rate than its receiver, the received echo signal is interpolated at the receiver. The interpolation may also be combined with the operations described in the second example embodiment to reduce the computational complexity by a factor of four compared to the first example embodiment.

In a sixth example embodiment, when the transmitter has a higher rate than the receiver, the echo signal is decimated at the receiver. The decimation may also be combined with the operations described in the second example embodiment to reduce the computational complexity by a factor of four compared to the first example embodiment.

In a seventh example embodiment, when the transmitted symbols are not aligned in time with the received symbols or frames, an asynchronous echo canceller may be used. The asynchronous echo canceller may be combined with any of the previously-described example embodiments.

In a DMT type modem, because all of the data is already available in the frequency domain, there is no need to do any additional Fourier transform or inverse Fourier transform operations, except for the asynchronous echo canceller embodiment which requires one extra IDFT. Moreover, some of the coefficients in the matrices may be very small and ignored, further reducing the computational complexity and memory required.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, protocols, data structures, and techniques, in order to provide a thorough understanding of the present invention. However, it will be apparent to one skilled in the art that the present invention may be practiced in other embodiments that depart from these specific details. In other instances, detailed descriptions of well-known methods, systems, and devices are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using one or more Digital signal Processors (DSPs).

Figure 1:
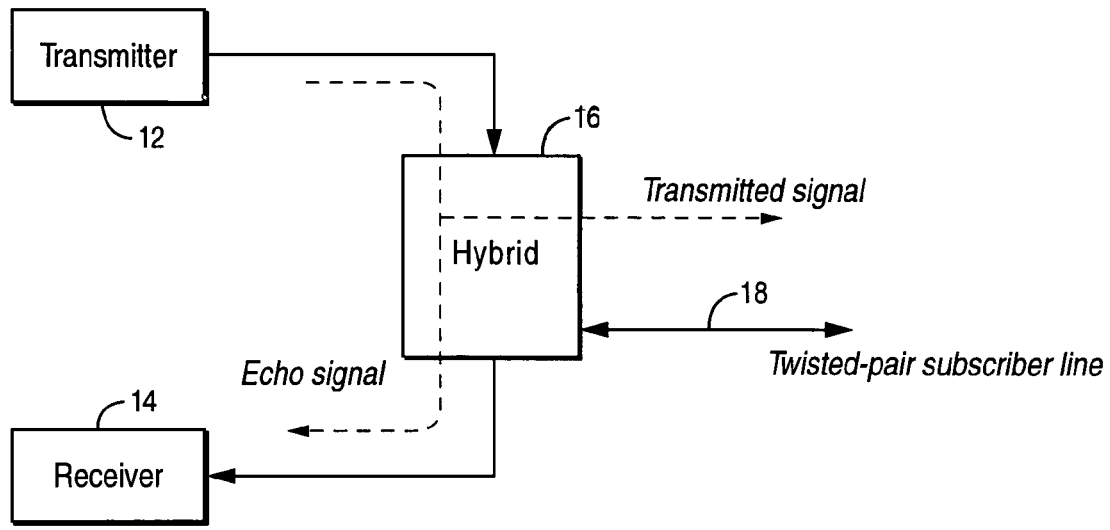
FIG. 1 illustrates a symmetric-rate DMT transceiver where the hybrid is unmatched to the subscriber line.
Figure 2:
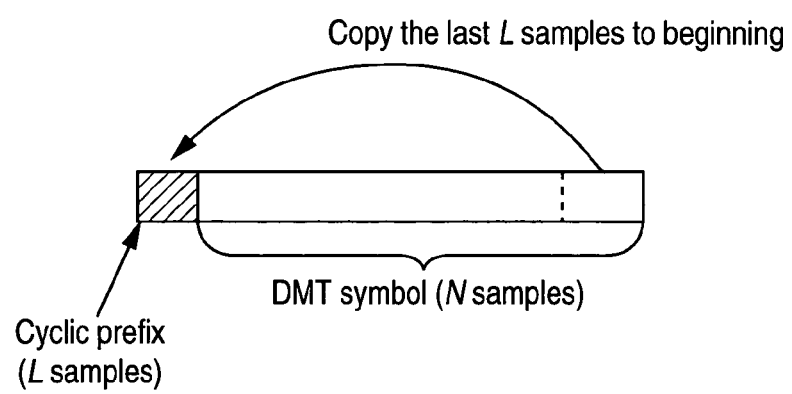
FIG. 2 illustrates cyclic prefixing.
Figure 3:
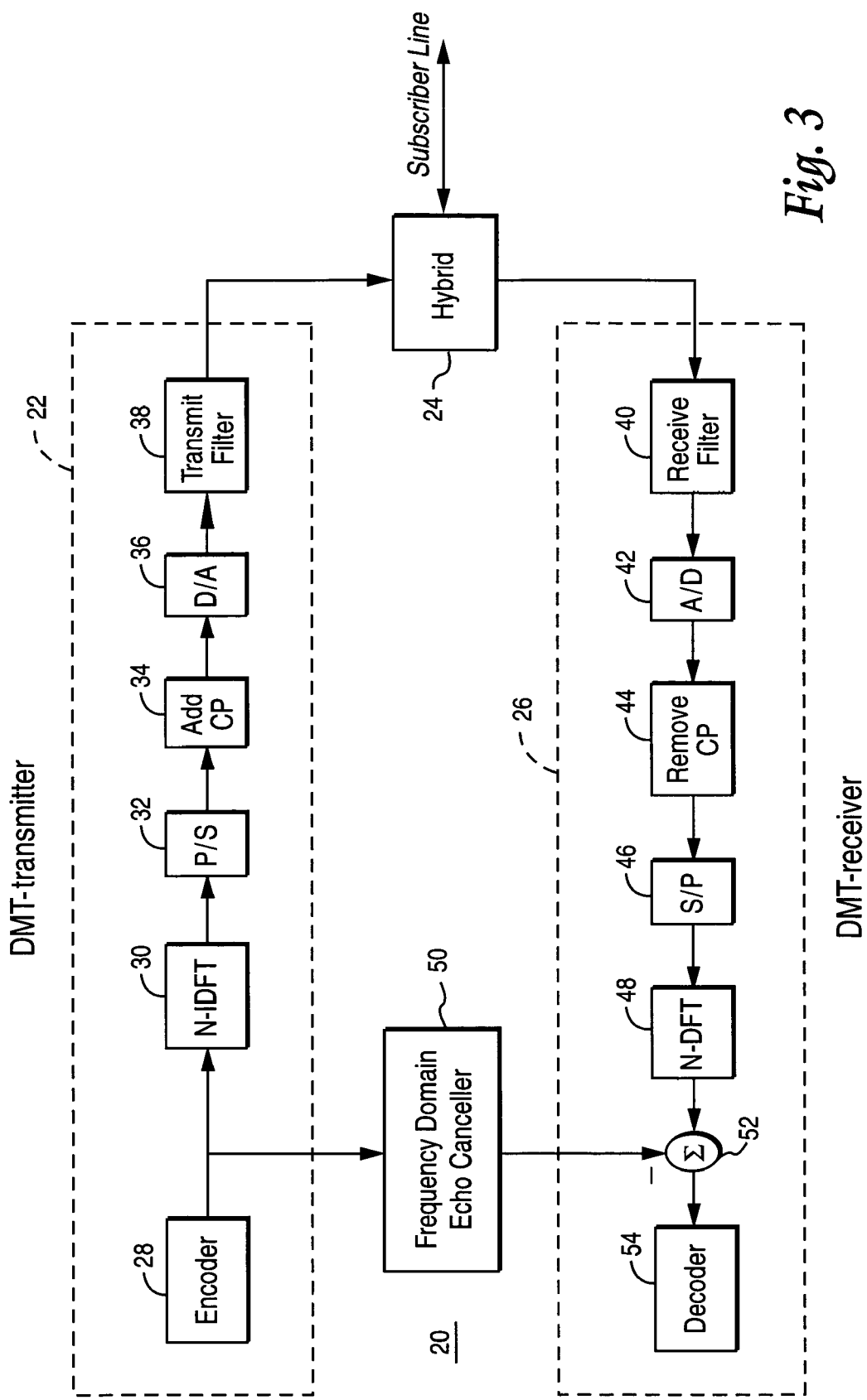
FIG. 3 shows a symmetric-rate DMT transceiver with an echo canceller.

A discrete multi-tone modem 20 in which the present invention may be employed is illustrated in FIG. 3. The DMT modem includes a DMT transmitter 22 and a DMT receiver 26 coupled to the subscriber line via a hybrid 24. Serial input data are grouped into blocks, converted into parallel form, and encoded by an encoder 28. Each one of N/2 active subchannels contains a number of bits allocated to that subchannel. Each block of bits is mapped into a two-dimensional signal constellation point (i.e., a complex number). The output from the encoder 28 is N/2 complex numbers (i.e., sub-symbols), one for each block of bits. The N/2 complex sub-symbols constitute a DMT symbol in the frequency domain and are extended to Hermitian symmetry (i.e., conjugate symmetry) before being input to block 30, which calculates the inverse discrete Fourier transform (IDFT). Due to the Hermitian symmetry property, the N-IDFT output is a sequence consisting of N real samples. The output sequence consists of the superposing of the N/2 modulated orthogonal carriers. The parallel N-IDFT output is converted to a serial stream by a parallel-to-serial converter 32. The digital modulated data stream is cyclically prefixed in the Add CP block 34, converted to analog form by digital-to-analog converter 36, filtered at the transmit filter 38, and passed to the hybrid 24 for transmission over the subscriber line.

At the receiver end, the received analog signal from the hybrid 24 is filtered in receive filter 40, converted to digital form in the analog to digital converter 42, and stripped of the cyclic prefix in the Remove CP block 44. The resulting digital signals are converted to parallel format in the serial-to-parallel converter 46. The parallel digital signals are demodulated in the N-DFT block 48. The frequency domain echo canceller 50 estimates the echo caused by the reflected signals from the DMT transmitter 22, and those echo signal estimates are removed from the demodulated signal at block 52. The remaining frequency domain signal is equalized, decoded, and converted back to a serial form by decoder 54.

The remaining description will focus on the frequency domain echo canceller 50. To understand the mathematical foundation of the echo canceller of the present invention, a mathematical expression of the received echo signal in the frequency domain is derived as a function of the transmitted frequency domain signal and the echo path channel. A significant feature of the invention echo canceller is that the received echo signal is cancelled completely in the frequency domain. This is particularly beneficial in a DMT transceiver where the transmitted data is already available in the frequency domain. There is no need to do any extra DFT or IDFT calculations except for the later-described asynchronous echo cancellation embodiment which requires only one extra IDFT.

As explained above, the received echo signal includes ISI and ICI because of the long impulse response of the echo path channel. In order to estimate the received echo signal, a frequency domain model of the echo path channel should include the effects of the ISI and the ICI.

The following notations are introduced:

$$X_i = [X_i(0), X_i(1), \ldots, X_i(N-1)]^T \quad (1)$$

$X_i$ denotes the i:th transmitted frequency domain symbol containing the N transmitted frequency subsymbols $X_i(k)$, where subscript i denotes the DMT symbol number and k denotes the frequency sample number. Note that the vector $X_i$ is Hermitian symmetric in order to obtain a real-valued sequence after the IDFT.

The Hermitian symmetry of the vector $X_i$ is defined as $$X_i(k) = X_i^*(N-k), \text{ for } k = N/2+1, N/2+2, \ldots, N-1, \quad (2)$$

where * denotes complex conjugate. Furthermore, the DC term $X_i(0)$ and the Nyquist term $X_i(N/2)$ must both be real-valued. Note that $X_i$ is the transceiver's own transmitted signal that generates the echo signal $Y_i$. The vector $$Y_i = [Y_i(0), Y_i(1), \ldots, Y_i(N-1)]^T \quad (3)$$

denotes the i:th received frequency domain (Hermitian symmetric) echo symbol containing the receiving frequency subsymbols $Y_i(k)$. Only the received echo signal is considered, and the far-end data signal is ignored. Thus, the scenario emulates the echo canceller training mode where the far-end modem is silent.

The N-point IDFT of $X_i$ can be expressed by $$x_i = QX_i, \quad (4)$$

where Q is the IDFT matrix defined by $$[Q]_{n,k} = \frac{1}{N} e^{j\frac{2\pi}{N}nk}, \text{ for } n = 0, 1, \ldots, N-1 \text{ and } k = 0, 1, \ldots, N-1 \quad (5)$$

Defining $Q_{cp}$ as a matrix containing the last L rows of Q, i.e. for n=0, 1, . . . , L–1 results in the following:

$$[Q_{cp}]_{n,k} = [Q]_{N-L+n,k} \quad (6)$$

The transmitted, prefixed time domain symbol $x_i$ is written as:

$$x_i = \begin{bmatrix} Q_{cp} \\ Q \end{bmatrix} X_i \quad (7)$$

The sequence consisting of the i–1:th and i:th prefixed time domain DMT-symbol can be written as:

$$x = \begin{bmatrix} Q_{cp} & \emptyset_{LxN} \\ Q & \emptyset_{NxN} \\ \emptyset_{LxN} & Q_{cp} \\ \emptyset_{NxN} & Q \end{bmatrix} \begin{bmatrix} X_{i-1} \\ X_i \end{bmatrix} = Q_{tot}X, \quad (8)$$

where $\emptyset_{LxN}$ denotes a matrix with L rows and N columns consisting of zero-valued elements.

The length of the echo path channel is assumed to be M samples long, and the impulse response of the echo path channel is denoted with the convolution matrix, G, which is of size (2N+2L)×(2N+2L).

$$G = \begin{bmatrix} g(0) & 0 & \ldots & 0 & \ldots & 0 & \ldots & 0 & 0 \\ g(1) & g(0) & \ldots & 0 & \ldots & 0 & \ldots & 0 & 0 \\ \ldots & \ldots & \ldots & \ldots & \ldots & \ldots & \ldots & \ldots & \ldots \\ g(M-1) & g(M-2) & \ldots & g(0) & \ldots & 0 & \ldots & 0 & 0 \\ 0 & g(M-1) & \ldots & g(1) & \ldots & 0 & \ldots & 0 & 0 \\ \ldots & \ldots & \ldots & \ldots & \ldots & \ldots & \ldots & \ldots & \ldots \\ 0 & 0 & \ldots & 0 & \ldots & g(M-1) & \ldots & g(1) & g(0) \end{bmatrix} \quad (9)$$

The received time domain echo signal equals $$y = GQ_{tot}X \quad (10)$$

In the receiver, only the i:th DMT-symbol is of interest. It contains both ISI and ICI. The cyclic prefix (CP) is discarded, and the received vector y is multiplied with the DFT matrix R of size (N×N), defined as $$[R]_{n,k} = e^{-j\frac{2\pi}{N}nk} \quad (11)$$

With $R_{tot}$ defined as $R_{tot}=[\emptyset_{N\times(N+L)} \emptyset_{N\times L} R]$, the received i:th frequency domain DMT-symbol (vector of size N×1) is obtained as:

$$Y_i = R_{tot} G Q_{tot} X = AX = [A_{prev} A_{current}] \begin{bmatrix} X_{i-1} \\ X_i \end{bmatrix}. \quad (12)$$

This can also be written as $$Y_i = A_{prev} X_{i-1} + A_{current} X_i, \quad (13)$$

where the following matrices of size (N×N) are defined:

$$A_{prev} = \begin{bmatrix} p_{0,0} & p_{0,1} & \cdots & \cdots & p_{0,N-1} \\ p_{1,0} & p_{1,1} & \cdots & & \\ \cdots & & \cdots & & \\ \cdots & & & \cdots & \\ p_{N-1,0} & \cdots & \cdots & & p_{N-1,N-1} \end{bmatrix} \quad (14)$$

$$A_{current} = \begin{bmatrix} c_{0,0} & c_{0,1} & \cdots & \cdots & c_{0,N-1} \\ c_{1,0} & c_{1,1} & \cdots & & \\ \cdots & & \cdots & & \\ \cdots & & & \cdots & \\ c_{N-1,0} & \cdots & \cdots & & c_{N-1,N-1} \end{bmatrix} \quad (15)$$

Thus, the k:th received frequency echo sample in the i:th symbol can be written as $$Y_i(k) = c_{k,k} X_i(k) + \sum_{\substack{m=0 \\ m\neq k}}^{N-1} c_{k,m} X_i(m) + \sum_{m=0}^{N-1} p_{k,m} X_{i-1}(m) \quad (16)$$

From equation (16), the first term $c_{k,k} X_i(k)$ describes the direct echo from the carrier number k in the symbol number i. The second term $$\sum_{\substack{m=0 \\ m\neq k}}^{N-1} c_{k,m} X_i(m)$$

describes the ICI from symbol number i. The third term $$\sum_{m=0}^{N-1} p_{k,m} X_{i-1}(m)$$

describes the combined ICI and ISI from the previously transmitted symbol number i−1. If the cyclic prefix was longer than the echo channel memory, then only the first term would be non-zero, and there would not be ISI or ICI terms because the matrix $A_{current}$ will only have non-zero values at the main diagonal (upper left corner to the lower right corner), and the matrix $A_{prev}$ would contain only zeros.

Hence, the matrix $A_{prev}$ describes how the echo from the previously transmitted frequency domain symbol leaks into or distorts the received symbol. The matrix $A_{current}$ describes how the echo from the currently transmitted frequency domain symbol leaks into or distorts the received symbol. Accordingly, the two matrices $A_{prev}$ and $A_{current}$ model how ISI and ICI will affect the echo signal completely in the frequency domain. By determining the coefficients for the matrices $A_{prev}$ and $A_{current}$, the echo in the frequency domain will be known and can then be subtracted from the received signal. The coefficients of the unknown matrices $A_{prev}$ and $A_{current}$ can be adaptively identified in order to estimate the received echo signal. Matrices $A_{prev}$ and $A_{current}$ can also be calculated from equation (12) by estimating the echo path channel impulse response (matrix G).

Figure 4:
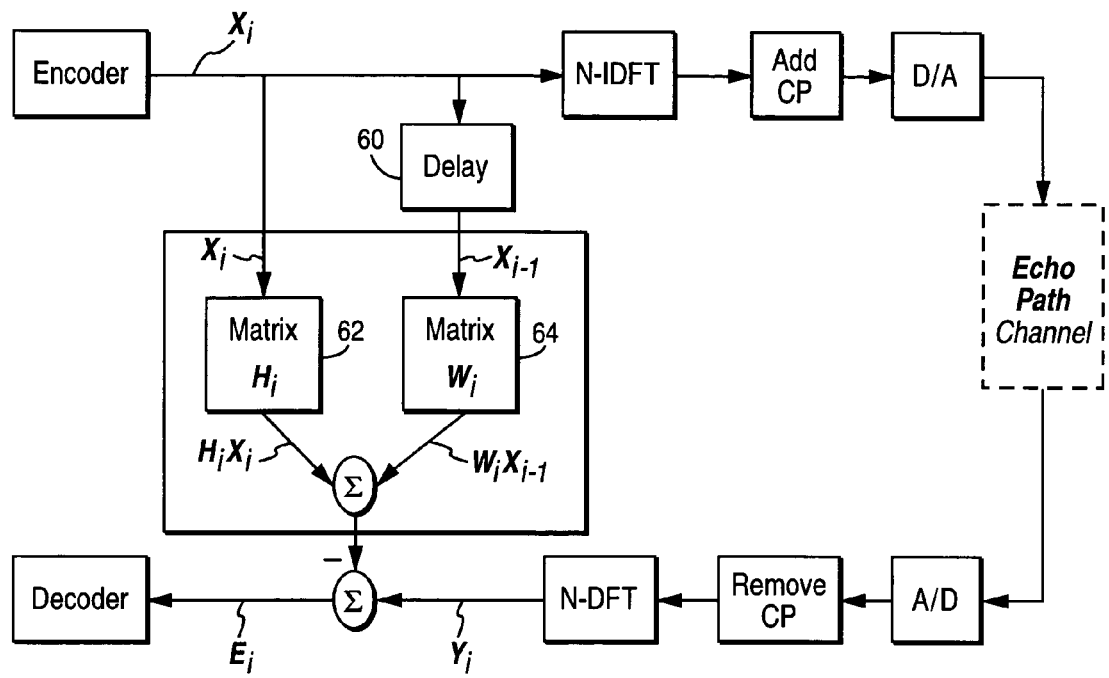
FIG. 4 shows a symmetric-rate DMT transceiver with one example embodiment of a frequency domain echo canceller.

FIG. 4 shows a transceiver using Discrete Multitone (DMT) as a modulation scheme with a first, non-limiting, example embodiment of a matrix-based frequency domain echo canceller (MBAEC) structure. There are two complex matrices Hi and Wi, numbered 62 and 64, respectively. Each matrix has a size of (N×N), where N is the size of the IDFT and DFT. The received echo signal is estimated in the frequency domain by multiplying the matrix Hi with the currently transmitted frequency domain symbol (an N×1 vector), Xi, output by the encoder, and multiplying the matrix Wi with the previously transmitted frequency domain symbol (an N×1 vector), Xi−1, output from delay 60. The two products Hi Xi and WiXi−1 are added together, i.e., $$\hat{Y}_i = H_i X_i + W_i X_{i-1} \quad (17)$$

where $$H_i = \begin{bmatrix} H_{0,0} & H_{0,1} & \cdots & \cdots & H_{0,N-1} \\ H_{1,0} & H_{1,1} & \cdots & & \\ \cdots & & \cdots & & \\ \cdots & & & \cdots & \\ H_{N-1,0} & \cdots & \cdots & & H_{N-1,N-1} \end{bmatrix} \quad (18)$$

and $$W_i = \begin{bmatrix} W_{0,0} & W_{0,1} & \cdots & \cdots & W_{0,N-1} \\ W_{1,0} & W_{1,1} & \cdots & & \\ \cdots & & \cdots & & \\ \cdots & & & \cdots & \\ W_{N-1,0} & \cdots & \cdots & & W_{N-1,N-1} \end{bmatrix} \quad (19)$$

Thus, the k:th estimated frequency echo sample in the i:th symbol is $$\hat{Y}_i(k) = H_{k,k} X_i(k) + \sum_{\substack{m=0 \\ m\neq k}}^{N-1} H_{k,m} X_i(m) + \sum_{m=0}^{N-1} W_{k,m} X_{i-1}(m) \quad (20)$$

The hat symbol of $\hat{Y}_k(k)$ indicates that it is an estimation of the received echo signal $Y_i(k)$.

The estimated echo signal is subtracted from the received frequency domain symbol, and the resulting error vector $E_i=Y_i-\hat{Y}_i(k)$ is used by an adaptive algorithm, e.g., Least Mean Square (LMS), to adjust the matrix elements of $H_i$ and $W_i$. In regular operation, (after training) the error signal is also the desired data signal. Adjusting $H_i$ and $W_i$ with the LMS-algorithm yields:

$$H_{i+1}=H_i+\mu E_i(X_i^*)^T \quad (21)$$

$$W_{i+1}=W_i+\mu E_i(X_{i-1}^*)^T \quad (22)$$

where $E_i=Y_i-\hat{Y}_i=[E_i(0),E_i(1), \ldots, E_i(N-1)]^T$ is the i:th received frequency domain error vector and $\mu$ is the step size of the LMS algorithm. One can prove that the LMS algorithm will adapt the coefficients of $H_i$ to an estimate of $A_{current}$ and the coefficients of $W_i$ to an estimate of $A_{prev}$. Most of the coefficients of the matrices $H_i$ and $W_i$ are complex-valued. Hence, all arithmetic computations are complex additions, subtractions, and multiplications.

Some of the coefficients (elements) in $A_{current}$ and $A_{prev}$ will be almost zero and can therefore be neglected to reduce the computational complexity in equations (21) and (22). This will also reduce the amount of memory. In fact, $A_{current}$ and $A_{prev}$ may often be band matrices meaning that mainly the strong diagonal (left to right) and some of the upper and lower diagonals have non-zero values. The number of diagonals to be taken into account depends on the echo path channel (ISI and ICI) and the desired level of echo cancellation.

Figure 5:
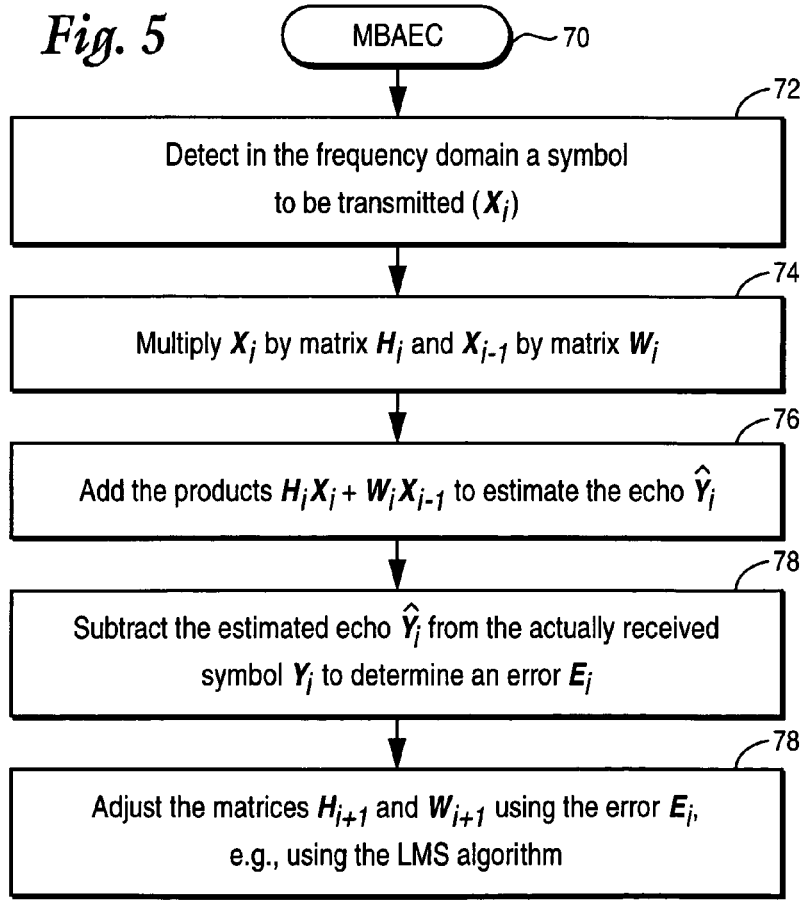
FIG. 5 shows a flowchart of procedures performed by the echo canceller in FIG. 4.

The operation of an echo canceller in accordance with the first, non-limiting, example embodiment and illustrated in FIG. 4 is now described in conjunction with the MBAEC routine (block 70) shown in flowchart format in FIG. 5. A signal to be transmitted $X_i$ is detected in the frequency domain (block 72). That signal is multiplied by matrix $H_i$ 62 and the previously transmitted frequency domain signal $X_{i-1}$ is multiplied by matrix $W_i$ (block 74). The matrix products are summed together, i.e., $H_iX_i+W_iW_{i-1}$, to estimate the current echo $\hat{Y}_i$ (block 76). The estimated echo $\hat{Y}_i$ is subtracted from the actually received symbol $Y_i$ to determine an error $E_i$ (block 78). The coefficient values of the H and W matrices are then adjusted for the next signal period i+1 with the detected error $E_i$ using for example the LMS algorithm (block 78).

When the transmitted time domain signal is real valued, e.g., in the case of DMT, it is possible to avoid the use of complex arithmetic. In order to obtain a real-valued, time domain signal, the frequency data must be Hermitian symmetric, and the DC and Nyquist terms must both be real-valued. In a second, non-limiting, example embodiment of the present invention, a real-valued implementation of the MBAEC reduces computational complexity by a factor of two compared to the general case described above. A real-valued vector is introduced as $$\tilde{X}_i = \begin{bmatrix} X_{real,i} \\ X_{imag,i} \end{bmatrix}, \quad (23)$$

where the vectors $X_{real,i}$ and $X_{imag,1}$ are defined as $$X_{real,i}=[X_i(0),X_{real,i}(1),X_{real,i}(2),\ldots,X_{real,i}(N/2-1),X_i(N/2)]^T \quad (24)$$

and $$X_{imag,i}=[X_{imag,i}(1),X_{imag,i}(2),\ldots,X_{imag,i}(N/2-1)]^T \quad (25)$$

In equations (24) and (25), $X_{real,i}(n)=Re\{X_i(n)\}$ and $X_{imag,i}(n)=Im\{X_i(n)\}$ are defined. Furthermore, $X(0)$ is the DC term, and $X(N/2)$ is the Nyquist term of $X_i$. The vector $\tilde{X}_i$ contains exactly the same information as the vector $X_i$ defined in equation (1), but in a slightly different order.

The matrices $Q_{cos}$ and $Q_{sin}$ are defined for k=0, 1, ..., N/2-1 and n=0, 1, ..., N-1 as $$[Q_{cos}]_{n,k} = \frac{2}{N}\cos\left(\frac{2\pi}{N}kn\right), \quad \text{for } k = 0, 1, \ldots, N/2 \quad (26)$$

$$[Q_{sin}]_{n,k} = \frac{2}{N}\sin\left(\frac{2\pi}{N}(k+1)n\right), \quad \text{for } k = 0, 1, \ldots, N/2-2 \quad (27)$$

Furthermore, the matrix $\tilde{Q}$ is defined as $$\tilde{Q}=[Q_{cos}Q_{sin}] \quad (28)$$

Equation (4) may be rewritten $$s_i=\tilde{Q}\tilde{X}_i \quad (29)$$

$\tilde{Q}_{cp}$ is further as a matrix containing the last L rows of $\tilde{Q}$, i.e. for n=0, 1, ... N-1 we have $$[\tilde{Q}_{cp}]_{n,k}=[\tilde{Q}]_{n-L+n,k} \quad (30)$$

The transmitted prefixed time domain symbol $x_i$ may now be written as $$x_i = \begin{bmatrix} \tilde{Q}_{cp} \\ \tilde{Q} \end{bmatrix}\tilde{X}_i \quad (31)$$

As in equation (8), the sequence of the i−1:th and i:th prefixed time domain DMT symbols can be written as $$x = \begin{bmatrix} \tilde{Q}_{cp} & \emptyset_{LxN} \\ \tilde{Q} & \emptyset_{NxN} \\ \emptyset_{LxN} & \tilde{Q}_{cp} \\ \emptyset_{NxN} & \tilde{Q} \end{bmatrix}\begin{bmatrix} \tilde{X}_{i-1} \\ \tilde{X}_i \end{bmatrix} = \tilde{Q}_{tot}\tilde{X} \quad (32)$$

With G defined in equation (9), the received time domain signal may be written as $$y=G\tilde{Q}_{tot}\tilde{X} \quad (33)$$

In the receiver, we are only interested in the i:th DMT symbol which contains both ISI and ICI. The cyclic prefix is discarded, the received vector y is multiplied with the matrix $\tilde{R}_{tot}$ defined as $$\tilde{R}_{tot}=[\emptyset_{Nx(N+L)}\emptyset_{NxL}\tilde{R}] \quad (34)$$

where $$\tilde{R}=[Q_{cos}-Q_{sin}] \quad (35)$$

The received i:th frequency domain data vector is now expressed as $$\tilde{Y}_i = \tilde{R}_{tot} G \tilde{Q}_{tot} \tilde{X} = \tilde{A} \tilde{X} = [\tilde{A}_{prev} \tilde{A}_{current}] \begin{bmatrix} \tilde{X}_{i-1} \\ \tilde{X}_i \end{bmatrix} \quad (36)$$

where we have defined $$\tilde{Y}_i = \begin{bmatrix} Y_{real,i} \\ Y_{imag,i} \end{bmatrix} \quad (37)$$

and $$Y_{real,i} = [Y_i(0), Y_{real,i}(1), Y_{real,i}(2), \ldots, Y_{real,i}(N/2-1), Y_i(N/2)]^T \quad (38)$$

$$Y_{imag,i} = [Y_{imag,i}(1), Y_{imag,i}(2), \ldots, Y_{imag,i}(N/2-1)]^T \quad (39)$$

Comparing equations (36) and (12), in equation (36) we have to perform $2N^2$ real-valued multiplications, and in equation (12), we need to perform $2N \times (N/2)$ complex-valued multiplications. Since one complex-valued multiplication requires four real-valued multiplications, the total number of real-valued multiplications is reduced by a factor of two in equation (36) compared to equation (12).

Figure 6:
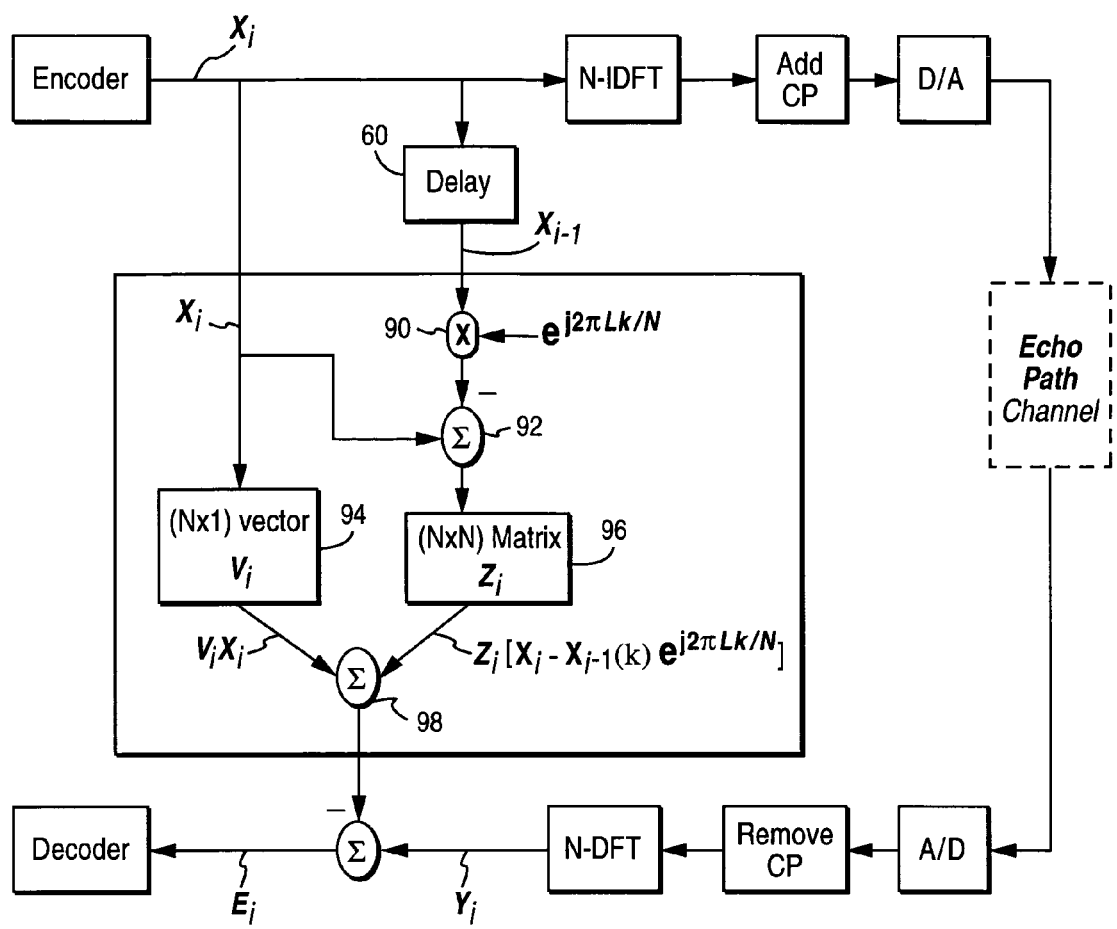
FIG. 6 shows a symmetric-rate DMT transceiver with another example embodiment of a domain echo canceller.

A third, non-limiting, example embodiment of an MBAEC is shown in FIG. 6. The $H_i$ matrix of size (N×N) is replaced by a vector $V_i$ 94 of size (N×1). A matrix also includes single column or row vectors, although the term vector is used here to distinguish from the N×N matrix of the embodiments described above. Furthermore, the matrix $W_i$ is replaced by another matrix $Z_i$ 96 of size (N×N). In this example embodiment, the previously transmitted frequency domain symbol $X_{i-1}$ is multiplied in multiplier 90 by a complex exponential term to compensate for the cyclic prefix, which has a length of L samples, i.e., $e^{j2\pi Lk/N}$. The product output from multiplier 90 is subtracted from $X_i$, and the difference is multiplied by matrix $Z_i$ 96. The vector and matrix products are summed in summer 98 to estimate the echo.

The following equations describe the algorithm:

$$\hat{Y}_i = V_i \cdot X_i + Z_i(X_i - \overline{X}_{i-1}), \quad (40)$$

where $$[\overline{X}_{i-1}]_k = [X_{i-1}]_k e^{j\frac{2\pi}{N}Lk}, \text{ for } k = 0, \ldots, N-1 \quad (41)$$

$X_i$ is the i:th transmitted frequency domain symbol, (N×1) vector, defined above.

$\hat{Y}_i$ is the i:th estimated echo signal in frequency domain, (N×1) vector.

$V_i$ and $Z_i$ is frequency domain vector and matrix of size (N×1) and (N×N).

Adjusting column vector $V_i$ and matrix $Z_i$ with the LMS algorithm yields:

$$V_{i+1} = V_i + \mu E_i \cdot (X_i^*)^T \quad (42)$$

$$Z_{i+1} = Z_i + \mu E_i (X_i^* - \overline{X}_{i-1}^*)^T \quad (43)$$

where $E_i = Y_i - \hat{Y}_i$ is the i:th received frequency domain error, (N×1) vector, $\mu$ is the stepsize of the LMS algorithm, and · denotes element-by-element vector multiplication.

Figure 7:
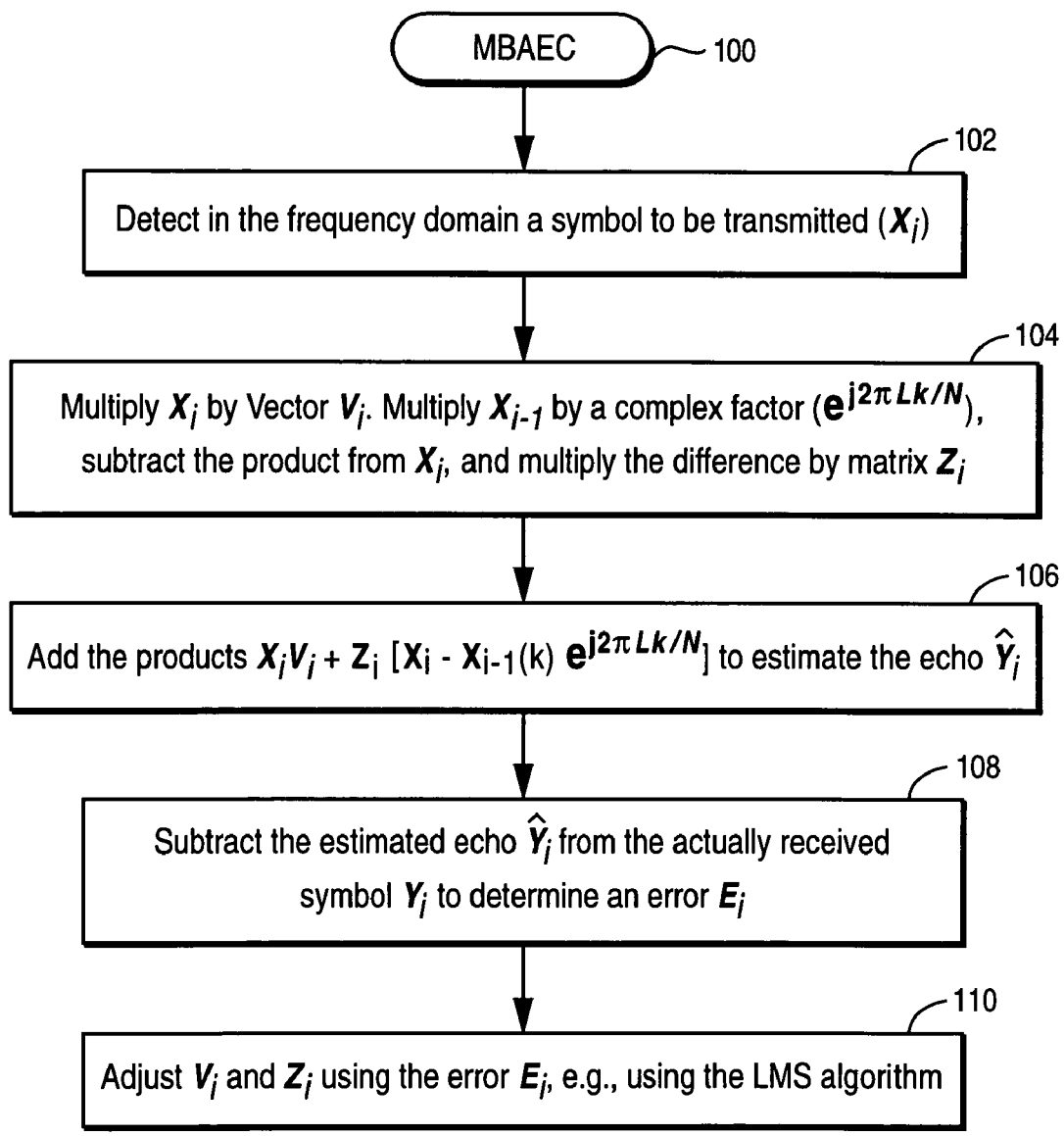
FIG. 7 shows a flowchart of procedures performed by the echo canceller of FIG. 6.

Example procedures for the operation of the third example embodiment MBAEC shown in FIG. 6 are now described in conjunction with the routine 100 shown in flowchart form in FIG. 7. The signal to be transmitted $X_i$ is detected in the frequency domain (block 120). That signal is multiplied by the column vector $V_i$. The previously transmitted signal $X_{i-1}$ is multiplied by a cyclic prefix compensating complex factor, which in this example embodiment is $e^{j2\pi Lk/N}$. That product is subtracted from the current signal to be transmitted $X_i$, and the difference is multiplied by the (N×N) matrix $Z_i$ (block 104). The products $V_i \cdot X_i$ and $Z_i(X_i - \overline{X}_{i-1})$ are summed to estimate the echo $\hat{Y}_i$ (block 106). The estimated echo $\hat{Y}_i$ is subtracted from the actually received symbol $Y_i$ to determine an error $E_i$ (block 108). The coefficients of the column vector $V_i$ and the matrix $Z_i$ are adjusted with the current error $E_i$ using the LMS algorithm (block 110).

As a fourth example, non-limiting embodiment, the operations described in the second and third example embodiments may be combined. Specifically, the real and imaginary parts of the current and prior symbols are determined and used to simplify the column vector $V_i$ and the matrix multiplication with matrix $Z_i$ in accordance with equations (23)-(39) set forth above. As a result, the computational complexity for performing the necessary data manipulations is reduced appropriately by a factor of four compared to the first example embodiment.

In a DMT application, the vectors $X_i, Y_i, \hat{Y}_i,$ and $E_i$ all have Hermitian symmetry. This property can be used to reduce the number of computations needed by only calculating the first N/2+1 coefficients of the vectors. Furthermore, the matrices $V_i$ and $Z_i$ need only be calculated and stored for the first N/2+1 rows. Moreover, the computational complexity may be further reduced by partitioning the vectors $X_i, \overline{X}_{i-1}, Y_i,$ and $E_i$ into real and imaginary parts in accordance with equations (23)-(39).

An MBAEC may be used in an asymmetric transceiver, such as an ADSL transceiver, with the modifications now described. When the modem's transmitter has a lower sampling rate than its receiver, the echo signal is interpolated at the receiver (a fifth, non-limiting, example embodiment). When the modem's transmitter has a higher sampling rate than the receiver, the echo signal will be decimated at the receiver (a sixth, non-limiting, example embodiment).

For an interpolated MBAEC, assume the size of the IDFT in the transmitter is N and the size of the DFT in the receiver is qN, where q=8 in ADSL. Thus, the received symbol contains q times more samples than the transmitted symbol. The received echo is therefore interpolated q times in the receiver. As one example interpolated asymmetric MBAEC, equation (40) is modified as follows:

$$\hat{Y}_i = V_i \cdot Xrep_i + Z_i(X_i - \overline{X}_{i-1}), \quad (44)$$

where $$[\overline{X}_{i-1}]_k = [X_{i-1}]_k e^{j\frac{2\pi}{N}Lk}, \text{ for } k = 0, \ldots, N-1 \quad (45)$$

$X_i$ is the i:th transmitted frequency domain symbol, (N×1) vector.

$Xrep_i$ is equal to the vector $X_i$ replicated q times, forming a block vector of contiguous vectors. For example, if q=4 then is $Xrep_i = [X_i^T X_i^T X_i^T X_i^T]^T$.

$\hat{Y}_i$ is the ith estimated echo signal in frequency domain, (qN×1) vector.

$V_i$ and $Z_i$ is frequency domain vector and matrix of size (qN×1) and (qN×N).

Adjusting $V_i$ and $Z_i$ with the proposed LMS-algorithm yields:

$$V_{i+1}=V_i+\mu E_i(X_i^* - \overline{X}_{i-1}^*)^T \quad (47)$$

where $E_i=Y_i-\hat{Y}_i$ is the i:th received frequency domain error, $\mu$ is the stepsize of the LMS algorithm, and · denotes element-by-element vector multiplication.

Hence, the only differences from equation (40) are the replication of $X_i$ and the size of the matrices and the vectors. Some of the coefficients in the vectors and in the matrices will be small and can be neglected to reduce the computational complexity and the required memory. In addition, the computational complexity in the interpolated MBAEC may be further reduced by partitioning the vectors $X_i$, $X_{rep_i}$, $\overline{X}_{i-1}$, $Y_i$, and $E_i$ into real and imaginary parts in accordance with equations (23)-(39).

For a decimated MBAEC, assume the size of the IDFT in the transmitter is qN and the size of the DFT in the receiver is N, where q=8 in ADSL. Thus, the transmitted symbol contains q times more samples than the received symbol. This means that the received echo will be decimated q times in the receiver. Equation (40) is modified as follows.

$$\hat{Y}_i=\text{Decimate}\{(V_i \cdot X_i), q\}+Z_i(X_i-\overline{X}_{i-1}), \quad (48)$$

where $$[\overline{X}_{i-1}]_k = [X_{i-1}]_k e^{j\frac{2\pi}{N}Lk}, \text{ for } k=0, \ldots, N-1 \quad (49)$$

$X_i$ is the i:th transmitted frequency domain symbol, (N×1) vector.

Decimate $\{(V_i \cdot x_i)_1 q\}$ means that the vector $V_i \cdot x_i$ is decimated q times in the frequency domain. In other words the frequency domain vector $V_i \cdot x_i$ is blocked into q contiguous vectors of N points each. These smaller vectors are then added together forming one vector of size (N×1).

$\hat{Y}_i$ is the i:th estimated echo signal in frequency domain, (N×1) vector.

$V_i$ and $Z_i$ is frequency domain vector and matrix of size (qN×1) and (N×qN).

Adjusting $V_i$ and $Z_i$ with the proposed LMS-algorithm yields:

$$V_{i+1}=V_i+\mu Erep_i \cdot (X_i^*)^T \quad (50)$$

$$Z_{i+1}=Z_i+\mu Erep_i(X_i^* \cdot \overline{X}_{i-1}^*)^T \quad (51)$$

where $E_i=Y_i-\hat{Y}_i$ is the i:th received frequency domain error, $Erep_i$ is of size (qN×1) and is equal to the vector $E_i$ replicated q times, forming a block vector of q contiguous vectors, $\mu$ is the stepsize of the LMS algorithm, and · denotes element-by-element vector multiplication.

Again, the only differences to equation (40) are the decimation of $V_i \cdot X_i$, the replication $E_i$, and the size of the matrices and the vectors. Some of the coefficients in the vectors and in the matrices will be very small and can be neglected to reduce the computational complexity and the required memory.

Figure 8:
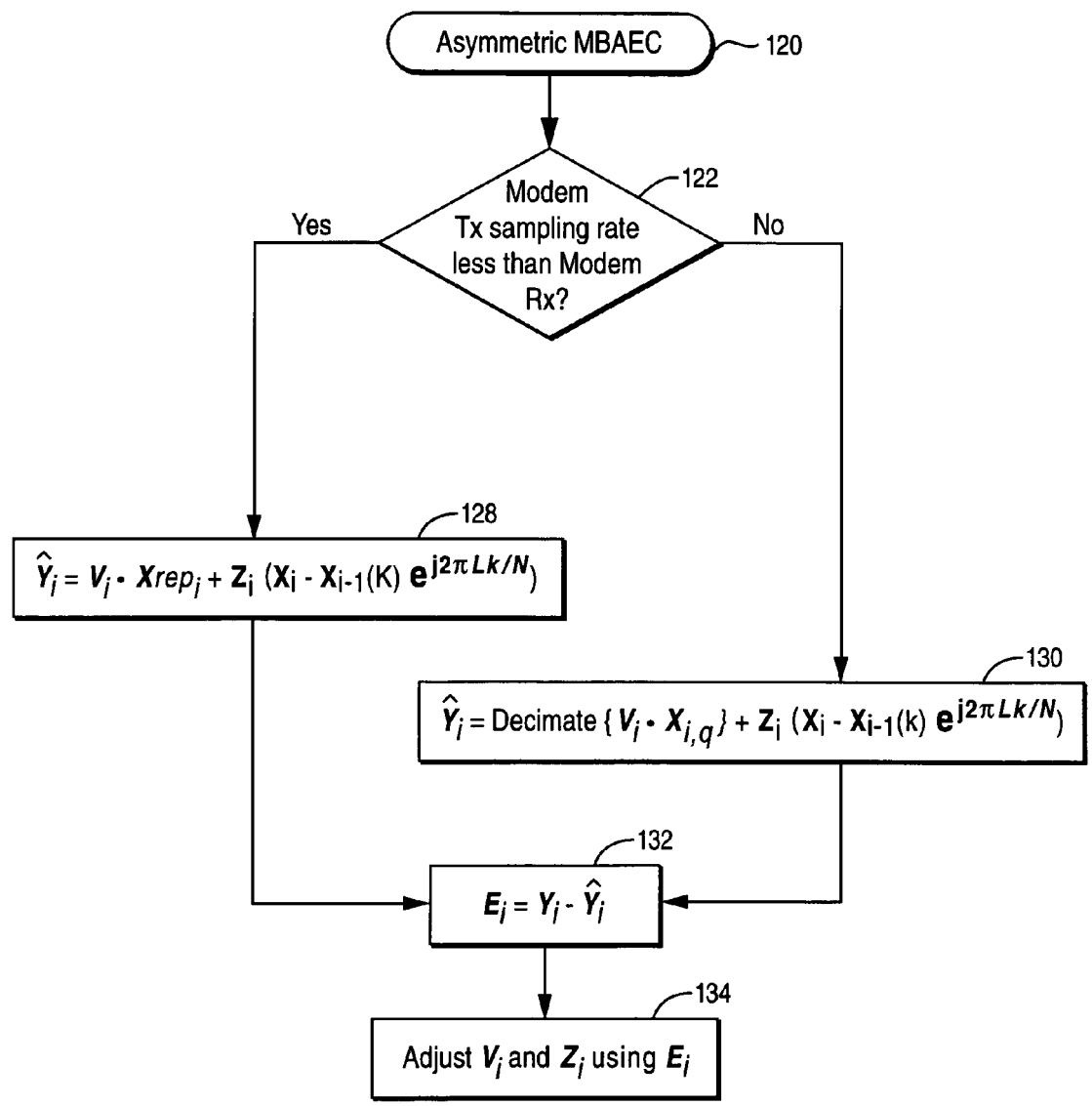
FIG. 8 shows another example embodiment of the invention as applied to asymmetric data rate transceiving situations.

An asymmetric MBAEC routine (block 120) is now described in FIG. 8. A decision is made in block 122 whether the modem transmitter sampling rate is less than the sampling rate at the modem transceiver. If so, the symbol to be transmitted is interpolated at the modem receiver, e.g., at the analog-to-digital converter, and the estimated echo $\hat{Y}_i$ is calculated using the following equation:

$$\hat{Y}_i=V_i \cdot Xrep_i+Z_i(X_i-\overline{X}_{i-1}) \quad (52)$$

(block 128). If the modem transmitter sampling rate is greater than that for the modem receiver, the symbol to be transmitted is decimated at the receiver, e.g., at the analog-to-digital converter, and the estimated echo $\hat{Y}_i$ is calculated in accordance with the following formula:

$$\hat{Y}_i=\text{Decimate}\{(V_i \cdot X_i), q\}+Z_i(X_i-\overline{X}_{i-1}) \quad (53)$$

For both the interpolation and decimation cases, the estimated echo $\hat{Y}_i$ is subtracted from the received signal $Y_i$ to determine the error $E_i$ (block 132). The coefficients of the column vector $V_i$ and the matrix $Z_i$ are adjusted with the error $E_i$ using for example the LMS algorithm (block 134).

Figure 9:
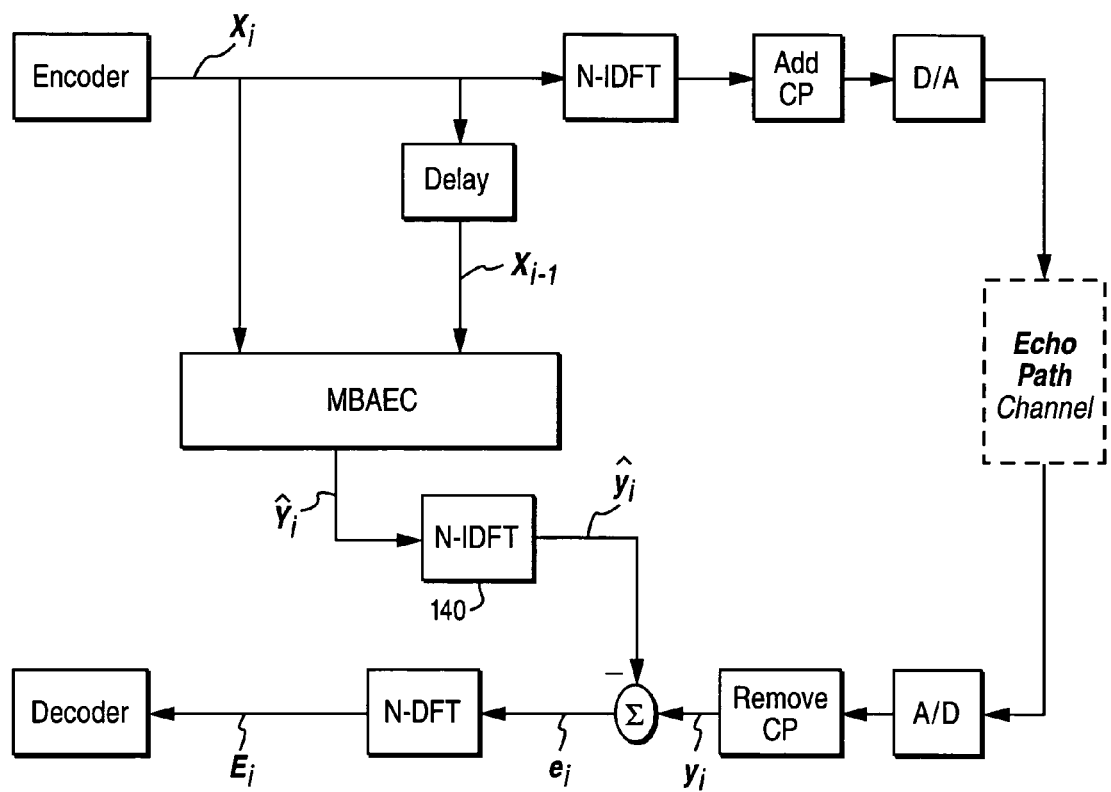
FIG. 9 shows a symmetric-rate DMT transceiver with another example embodiment of the invention as applied to asynchronous data transceiving situations.

A seventh, non-limiting, example embodiment of an echo canceller in accordance with the present invention may be used in an asynchronous transceiver, such as an ADSL transceiver at the Central Office, with the modifications now described. In an asynchronous transceiver, the transmitted and received frames or symbols are not aligned in time. Hence, there is a time offset between the transmitter and receiver symbols. In this seventh embodiment, the echo canceller is de-coupled from the receiver. Nevertheless, asynchronous MBAEC may be applied to any one of the previously-described embodiments with a small modification. Instead of removing the echo in the frequency domain, the estimated echo signal is first transformed to the time domain by an IDFT operation, and then removed in the time domain sample-by-sample. The asynchronous MBAEC is illustrated in FIG. 9. The estimated echo signal $\hat{Y}_i$ output from MBAEC is transformed into the time domain by an N–IDFT block 140 to produce an estimated echo in the time domain $\hat{y}_i$ which is then removed in the time domain sample-by-sample from the received echo $y_i$. The time domain difference or error $e_i$ is transformed into the complex domain in the N–DFT block which is located after the summation stage rather than before it as shown in FIGS. 4 and 6. In addition, the computational complexity in the decimated MBAEC may be further reduced by partitioning the vectors $X_i$, $\overline{X}_{i-1}$, $Y_i$, and $E_i$ into real and imaginary parts in accordance with equations (23)-(29).

Figure 10:
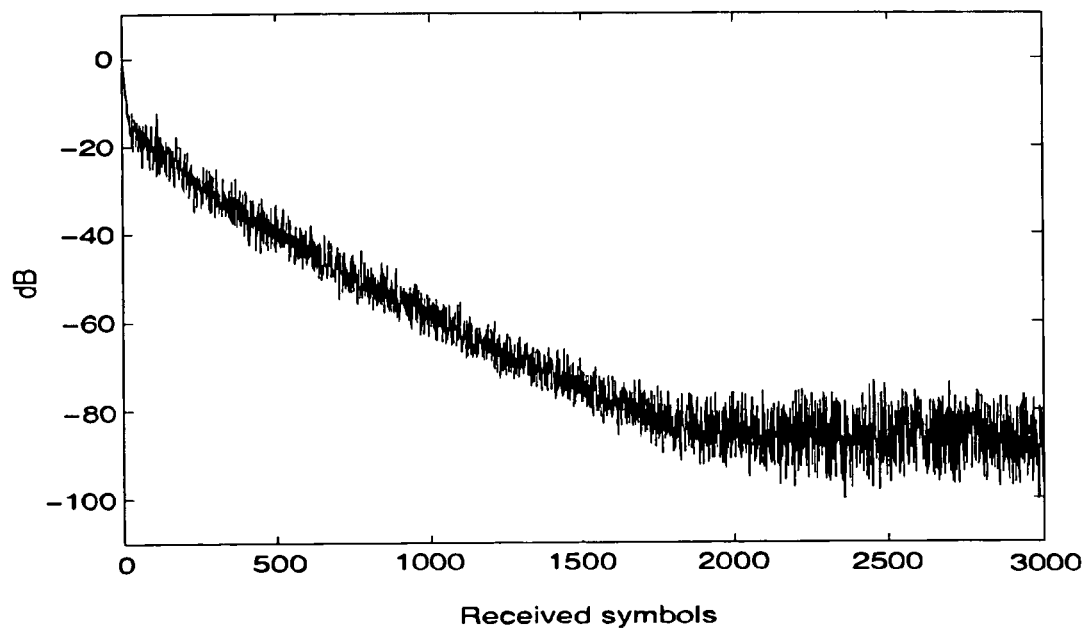
FIGS. 10 and 11 show the learning curve of the echo canceller of FIG. 6 implemented in a DMT-based, symmetric-rate DSL transceiver, using a simple lowpass model of the echo path channel.
Figure 11:
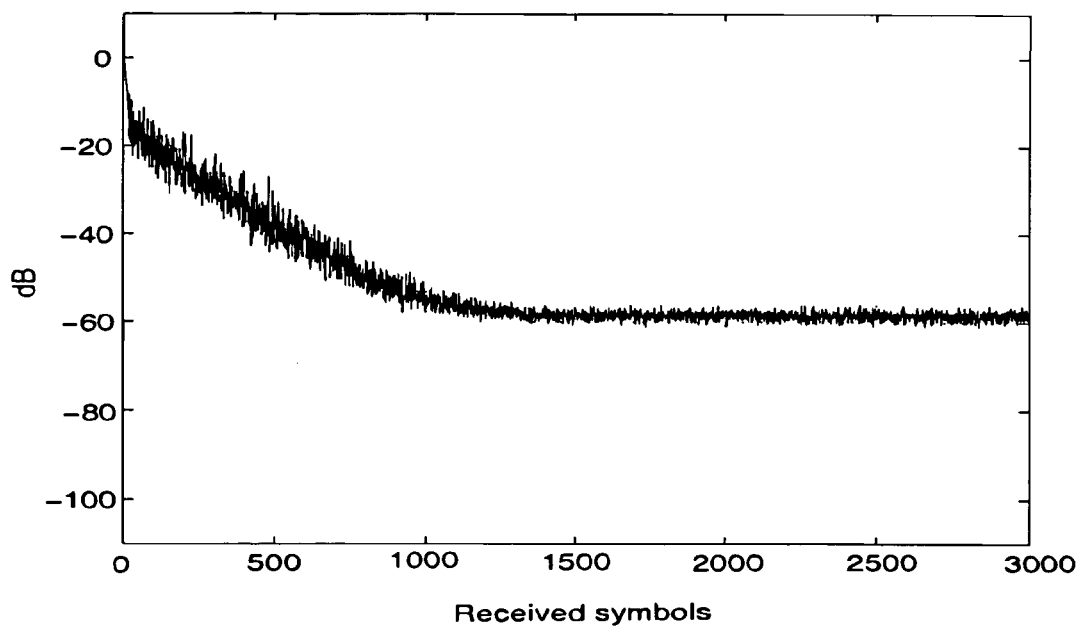

The proposed matrix-based adaptive echo canceller (MBAEC) has been implemented and simulated in different DMT-based transceivers such as a symmetric-rate DSL transceiver, an ADSL central office end transceiver, and an ADSL Subscriber end transceiver. FIGS. 10 and 11 show the learning curve of the matrix-based adaptive echo canceller (MBAEC), implemented in a DMT-based Symmetric-rate DSL transceiver, using a simple lowpass model of the echo path channel. The learning curve illustrates how the mean-square-error, MSE, is reduced during adaptation with the LMS-algorithm. The simulation results indicate that the present invention is reliable, accurate and performs according to theoretical expectations.

The matrix-based adaptive echo canceller is well-suited to follow slow channel fluctuations during transmission because the transmitted signal is used to adapt matrix coefficients. An echo canceller in accordance with the present invention is particularly efficient in a DMT system employing FDM (Frequency Division Multiplexing) because echo cancellation is only needed for a few carriers which leads to less computational complexity. Moreover, because the needed data are already available in the frequency domain, so there is no need to do any extra DFT or IDFT operations to implement the MBAEC, except for the asynchronous MBAEC, which requires one extra IDFT. Furthermore, some of the coefficients in the matrices and in the vectors will be zero or quite small, and therefore, can be ignored, which means that the computational complexity of and the required memory for the echo canceller will be reduced.

While the present invention has been described with respect to a particular embodiment, those skilled in the art will recognize that the present invention is not limited to the specific embodiments described and illustrated herein. Different formats, embodiments, and adaptations beside those shown and described as well as many modifications, variations, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the scope of the claims appended hereto.

What is claimed is:

1. An echo canceller for use in a transceiver, comprising:
   first electronic circuitry configured to estimate in the frequency domain an echo signal, and
   second electronic circuitry configured to remove in the frequency domain the estimated echo signal in the frequency domain from a received signal in the frequency domain,
   wherein the first electronic circuitry is further configured to estimate the echo signals in the frequency domain using a combination of (i) a product of a first matrix of coefficients in the frequency domain and a transmitted symbol and (ii) a product of a second matrix of coefficients in the frequency domain and a previously-transmitted symbol.

2. The echo canceller in claim 1, wherein transmitted signals corresponding to the transmitted symbol and the previously-transmitted symbol are real-valued, and wherein the transmitted symbol and the previously-transmitted symbol are divided into real and imaginary parts before being combined with the respective matrix to reduce computational complexity.

3. The echo canceller in claim 1, wherein the coefficients of the first matrix represent how an echo from a currently transmitted frequency domain signal affects a received signal.

4. The echo canceller in claim 3, wherein the coefficients of the second matrix represent how an echo from a previously transmitted frequency domain signal affects the received signal.

5. The echo canceller in claim 1, wherein the first electronic circuitry is further configured to adapt the coefficients of the first matrix and the second matrix using a difference between the received signal and the estimated echo signal.

6. The echo canceller in claim 5, wherein the first electronic circuitry is further configured to adapt the coefficients using a least mean squares algorithm.

7. The echo canceller in claim 1, wherein the transceiver is a discrete multitone (DMT) transceiver.

8. The echo canceller in claim 1, wherein the first and second matrices are N×N matrices, where N is a number of symbol samples.

9. The echo canceller in claim 1, wherein a vector corresponding to a transmitted frequency domain symbol, a vector corresponding to a received frequency domain signal, and a vector corresponding to an estimate of the echo symbol are all Hermitian symmetric.

10. The echo canceller for use in a transceiver, comprising:
    first electronic circuitry configured to estimate in the frequency domain an echo signal, and
    second electronic circuitry configured to remove in the frequency domain the estimated echo signal in the frequency domain from a received signal in the frequency domain,
    wherein the first electronic circuitry is further configured to estimate the echo signals in the frequency domain using a combination of a product of (i) a vector of coefficients in the frequency domain and a transmitted symbol and (ii) a product of a matrix of coefficients in the frequency domain and a compensated, previously-transmitted symbol.

11. The echo canceller in claim 10, wherein the first electronic circuitry is further configured to divide the transmitted symbol and the previously-transmitted symbol into real and imaginary parts before combining them respectively with the vector and the matrix to reduce computational complexity.

12. The echo canceller in claim 10, wherein a compensation factor used to compensate the previously-transmitted signal is a complex exponential term.

13. The echo canceller in claim 12, wherein the transceiver is a discrete multitone (DMT) transceiver and the compensation factor compensates for a cyclic prefix associated with the previously-transmitted signal.

14. The echo canceller in claim 1, wherein when a transmitter of the transceiver has a lower sampling rate than a receiver of the transceiver, the echo signal is interpolated at the receiver.

15. The echo canceller in claim 1, wherein when a transmitter of the transceiver has a higher sampling rate than a receiver of the transceiver, the echo signal is decimated at the receiver.

16. An echo canceller for use in an asynchronous transceiver configured to cancel an echo signal, comprising:
    a first matrix of coefficients;
    a second matrix of coefficients; and
    electronic circuitry configured to use a combination of (i) a product of the first matrix and a currently-transmitted symbol and (ii) a product of the second matrix and a previously-transmitted symbol to estimate an echo signal in the frequency domain, to transform the estimate of the echo signal into the time domain, and to remove the transformed estimate from a received signal in the time domain.

17. An echo canceller for use in an asynchronous transceiver configured to cancel an echo signal, comprising:
    a vector of coefficients in the frequency domain;
    a matrix of coefficients in the frequency domain,
    electronic circuitry configured to use a combination of (i) a product of the vector and a currently-transmitted symbol and (ii) a product of the matrix and a compensated, previously-transmitted symbol to estimate an echo signal in the frequency domain, to transform the estimated echo signal into the time domain, and to remove from a received signal in the time domain.

18. An echo canceller for use in a transceiver canceling an echo from a received signal in the frequency domain including circuitry configured to determine an estimate of the echo in the received signal using a frequency domain model of an echo path channel that takes into account effects of intercarrier interference and to subtract the echo estimate from the received signal.

19. The echo canceller in claim 18, wherein the echo canceller is used in a discrete multitone (DMT) type transceiver and the frequency domain model takes into account intersymbol interference.

20. The echo canceller in claim 18, wherein the frequency domain model includes a first set of values that models how an echo from a currently transmitted frequency domain symbol distorts the received signal and a second set of values that models how an echo from a previously transmitted frequency domain symbol distorts the received signal.

21. The echo canceller in claim 20, wherein the first set of values is a first complex matrix and the second set of values is a second complex matrix.

22. The echo canceller in claim 20, wherein the first set of values is a column vector and the second set of values is a matrix.

23. The echo canceller in claim 22, wherein the matrix is combined with a difference between the currently transmitted symbol and a product of the previously transmitted symbol and a compensating factor.

24. The echo canceller in claim 20, wherein the transmitted symbol and the previously transmitted symbol are divided into real and imaginary parts before being combined with the first and second sets of values, respectively.

25. The echo canceller in claim 18, wherein when a transmitter of the transceiver has a lower sampling rate than a receiver of the transceiver, the echo signal is interpolated at the receiver.

26. The echo canceller in claim 18, wherein when a transmitter of the transceiver has a higher sampling rate than a receiver of the transceiver, the echo signal is decimated at the receiver.

27. A frequency domain echo canceller for use in a transceiver canceling an echo from a received signal in the frequency domain including circuitry configured to determine an estimate of the echo in the received signal using a frequency domain model of an echo path channel that includes effects of intersymbol interference and inter-carrier interference and to subtract the echo estimate from the received signal to provide a difference.

28. The echo canceller in claim 27, wherein the frequency domain model includes a first set of values that models completely in the frequency domain how an echo from a currently transmitted frequency domain symbol distorts the received signal and a second set of values that models completely in the frequency domain how an echo from a previously transmitted frequency domain symbol distorts the received signal.

29. The echo canceller in claim 28, wherein transmitted signals corresponding to the currently and previously transmitted frequency domain symbols are real-valued.

30. The echo canceller in claim 29, wherein the currently transmitted symbol, the previously transmitted symbol, the received signal, and the difference are vectors having Hermitian symmetry.

31. The echo canceller in claim 28, wherein the difference is used to adjust the first and second set of values.

32. A method for reducing an echo at a transceiver comprising:
(a) combining in the frequency domain a currently-transmitted symbol with a first vector or matrix of coefficients in the frequency domain resulting in a first combination;
(b) combining in the frequency domain a previously-transmitted symbol with a second matrix of coefficients in the frequency domain resulting in a second combination;
(c) combining the first and second combinations in the frequency domain to estimate the echo in the frequency domain; and
(d) using the estimated echo to reduce the echo in a signal received at the transceiver.

33. The method in claim 32, further comprising:
determining a difference between the received signal and the estimated echo, and
adjusting the first and second set of values using the difference.

34. The method in claim 32, wherein the first vector or matrix corresponds to a first matrix of coefficients.

35. The method in claim 32, wherein the first vector or matrix corresponds to a column vector of coefficients.

36. The method in claim 35, wherein the combining step (b) includes:
multiplying the previously transmitted symbol by a compensation factor to produce a product;
subtracting the product from the currently transmitted symbol; and
combining a result of the subtracting with the matrix.

37. The method in claim 32, wherein when a transmitter of the transceiver has a lower sampling rate than a receiver of the transceiver, the method further comprising:
interpolating the echo signal.

38. The method in claim 32, wherein when a transmitter of the transceiver has a higher sampling rate than a receiver of the transceiver, the method further comprising:
decimating the echo signal.

39. The method in claim 32, wherein a vector corresponding to a transmitted frequency domain symbol, a vector corresponding to a received frequency domain signal, a vector corresponding to an estimate of the echo symbol are Hermitian symmetric.

40. The method in claim 32, further comprising:
dividing the currently transmitted symbol and the previously-transmitted symbol into real and imaginary parts before the combining steps (a) and (b), respectively, to reduce computational complexity.

41. The method according to claim 32, wherein the transceiver is an asynchronous transceiver, the method further comprising:
transforming the estimated echo into the time domain, and
removing in the time domain, the estimated echo signal from the received signal on a sample-by-sample basis.

* * * * *

UNITED STATES PATENT AND TRADEMARK OFFICE
CERTIFICATE OF CORRECTION

PATENT NO.      : 7,672,447 B2
APPLICATION NO. : 09/584796
DATED           : March 2, 2010
INVENTOR(S)     : Lindqvist et al.

It is certified that error appears in the above-identified patent and that said Letters Patent is hereby corrected as shown below:

On Page 2, in Item (56), under "OTHER PUBLICATIONS", in Column 1, Line 8, delete "Enchede," and insert -- Enschede --, therefor.

In Fig. 7, Sheet 5 of 8, for Tag "104", Line 1, delete "$V_i$." and insert -- $V_i$, --, therefor.

In Column 1, Line 43, delete "General" and insert -- Generally --, therefor.

In Column 2, Line 52, delete "symbols." and insert -- symbol. --, therefor.

In Column 2, Line 53, after "is" insert -- (L+N) --.

In Column 5, Line 33, delete "of" and insert -- for --, therefor.

In Column 5, Line 51, in Equation (1), delete "$X_i=[X_i(0), X_1(1,),$" and insert -- $X_i=[X_i(0), X_i(1,),$ --, therefor.

In Column 6, Line 2, delete "receiving" and insert -- received --, therefor.

In Column 6, Line 10, in Equation (4), delete "$x_i=QX_i$" and insert -- $s_i=QX_i$ --, therefor.

In Column 7, Line 9, delete "N×I)" and insert -- N×1) --, therefor.

In Column 9, Line 10, delete " $E_i = Y_i = \hat{Y}_i$ " and insert -- $E_i = Y_i - \hat{Y}_i$ --, therefor.

In Column 9, Line 57, delete "$X_{imag,1}$" and insert -- $X_{imag,i}$ --, therefor.

In Column 9, Line 60, Equation (24), delete "$(N/2)]^t$" and insert -- $(N/2)]^T$ --, therefor.

In Column 10, Line 25, after "further" insert -- defined --.

In Column 10, Line 26, delete "N-1" and insert -- L-1 --, therefor.

Signed and Sealed this

Nineteenth Day of October, 2010

David J. Kappos
*Director of the United States Patent and Trademark Office*

CERTIFICATE OF CORRECTION (continued)
U.S. Pat. No. 7,672,447 B2

In Column 11, Line 42, in Equation (40), delete " $\hat{Y}_i = V \cdot X_i + Z_i(X_i - \overline{X}_{i-1}),$ " and insert -- $\hat{Y}_i = V_i \bullet X_i + Z_i(X_i - \overline{X}_{i-1})$ --, therefor.

In Column 11, Line 63, in Equation (43), delete " $Z_{i+1} Z_i + \mu E_i (X_i^* - \overline{X}_{i-1}^*)^T$ " and insert -- $Z_{i+1} = Z_i + \mu E_i \left( X_i^* - \overline{X}_{i-1}^* \right)^T$ --, therefor.

In Column 13, above Equation (47), insert -- $V_{i+1} = V_i + \mu E_i \bullet \left( Xrep_i^* \right)^T$ (46) --.

In Column 13, Line 5, Equation (47) delete " $V_{i+1} = V_i + \mu E_i (X_i^* - \overline{X}_{i-1}^*)^T$ " and insert -- $Z_{i+1} = Z_i + \mu E_i \left( X_i^* - \overline{X}_{i-1}^* \right)^T$ --, therefor.

In Column 13, Line 37, delete " {(V$_i$·x$_i$)$_1$q} " and insert -- {(V$_i$·x$_i$),q} --, therefor.

In Column 13, Line 51, in Equation (51), delete " $Z_{i+1} = Z_i + \mu Erep_i(X_i^* \cdot \overline{X}_{i-1}^*)^T$ " and insert -- $Z_{i+1} = Z_i + \mu Erep_i \left( X_i^* - \overline{X}_{i-1}^* \right)^T$ --, therefor.

In Column 14, Line 43, delete "(29)." and insert -- (39). --, therefor.

In Column 16, Line 59, in Claim 17, after "remove" insert -- the transformed estimate --.